Jan. 19, 1960  P. C. ZANOTTO ET AL  2,921,713
FEEDER BOWL LEVEL SWITCH AND HOPPER CONTROL
Filed Feb. 25, 1957  3 Sheets-Sheet 1

INVENTOR.
PAUL C. ZANOTTO
THOMAS J. SMITH
BY William D. Carothers
THEIR ATTORNEY

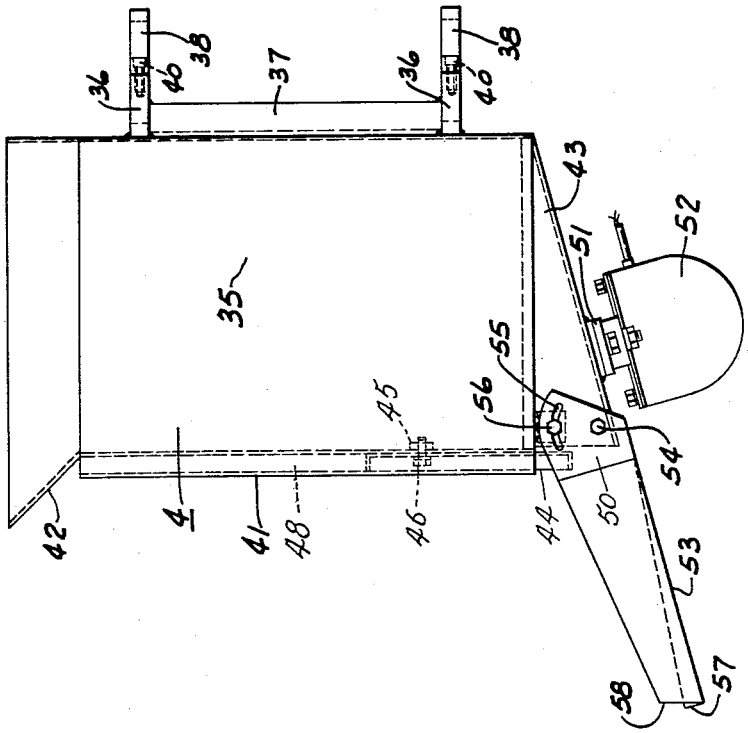
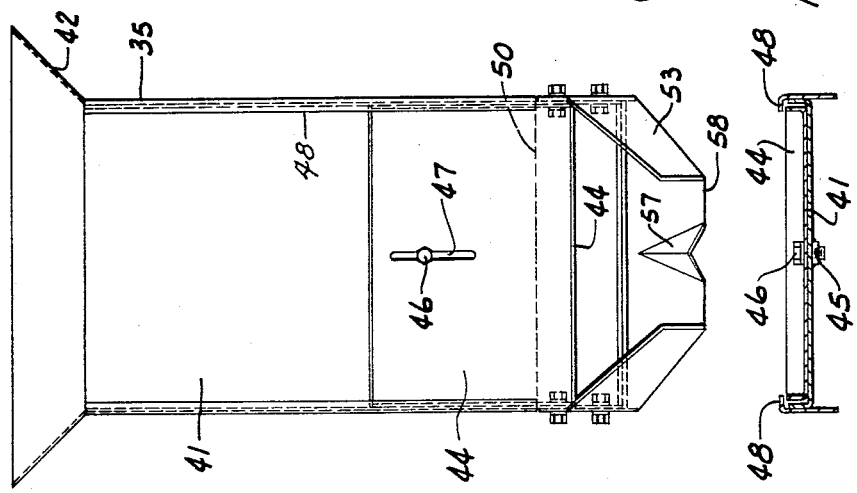

Jan. 19, 1960   P. C. ZANOTTO ET AL   2,921,713
FEEDER BOWL LEVEL SWITCH AND HOPPER CONTROL
Filed Feb. 25, 1957   3 Sheets-Sheet 3

INVENTOR.
PAUL C. ZANOTTO
THOMAS J. SMITH
BY William D. Carothers

THEIR ATTORNEY

United States Patent Office 2,921,713
Patented Jan. 19, 1960

2,921,713

FEEDER BOWL LEVEL SWITCH AND HOPPER CONTROL

Paul C. Zanotto, Leechburg, and Thomas J. Smith, Homer City, Pa., assignors to Syntron Company, Homer City, Pa., a corporation of Delaware Application February 25, 1957, Serial No. 641,979

7 Claims. (Cl. 222—56)

This invention relates generally to the art of orienting parts and feeding them properly oriented to a production line when they are applied in assembling a machine and more particularly to a hopper level switch to control the supply of the parts to the feeder for orientation and supply in automation.

A bowl parts feeder for orienting and supplying parts to a production line presents different problems. If the feeder bowl gets too full the parts are tumbled on themselves which may chip and wear these parts before they are assembled on the machine.

If the feeder bowl is too full the excess can interfere with the proper orientation of the parts before they leave the bowl. This can jam the supply by improper orientation of the parts. If an improperly oriented part can pass to the point of supply in its wrong position the whole purpose of the automation is defeated.

If, on the other hand, the supply of parts from the hopper to the feeder can be kept constant by supplying a continuous flow from the hopper without the constant need of attention from an operator these problems disappear. This may be accomplished by providing a bowl feeder hopper switch actuated by a flap that actually engages the parts circulating around the bottom of the bowl, and if they reach a level higher than that desired the switch will discontinue the hopper feed until the proper level of parts is maintained in the feeder bowl. This necessitates the use of a novel hopper feed control that can be regulated by the bowl feeder level switch. This may be accomplished by providing a hopper with a bottom, the slope of which is insufficient to allow the parts to slide by gravity but when vibrated they will flow. Thus a vibrator on the low sloping hopper bottom provides the control of feed which when energized by the feeder bowl level switch maintains the proper level of parts in the bowl at any one time.

Other objects and advantages of this invention appear hereinafter in the following description and claims.

The accompanying drawings show for the purpose of exemplification, without limiting this invention or the claims thereto, certain practical embodiments illustrating the principles of this invention wherein:

Fig. 3 is an enlarged view of the side elevation of the hopper.

Fig. 4 is an enlarged front and elevation of the hopper structure shown in Fig. 3.

Fig. 5 is a sectional view of the hopper gate valve.

Figure 2:
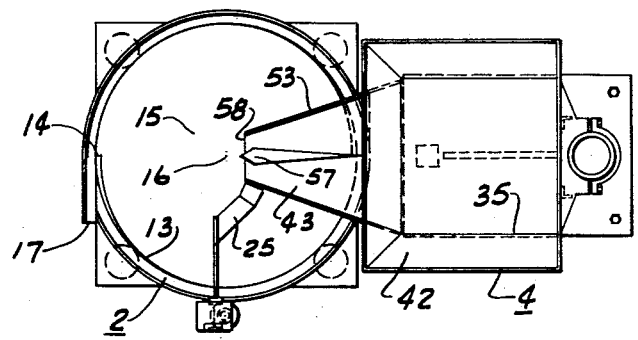
Fig. 2 is a plan view of Fig. 1.
Figure 1:
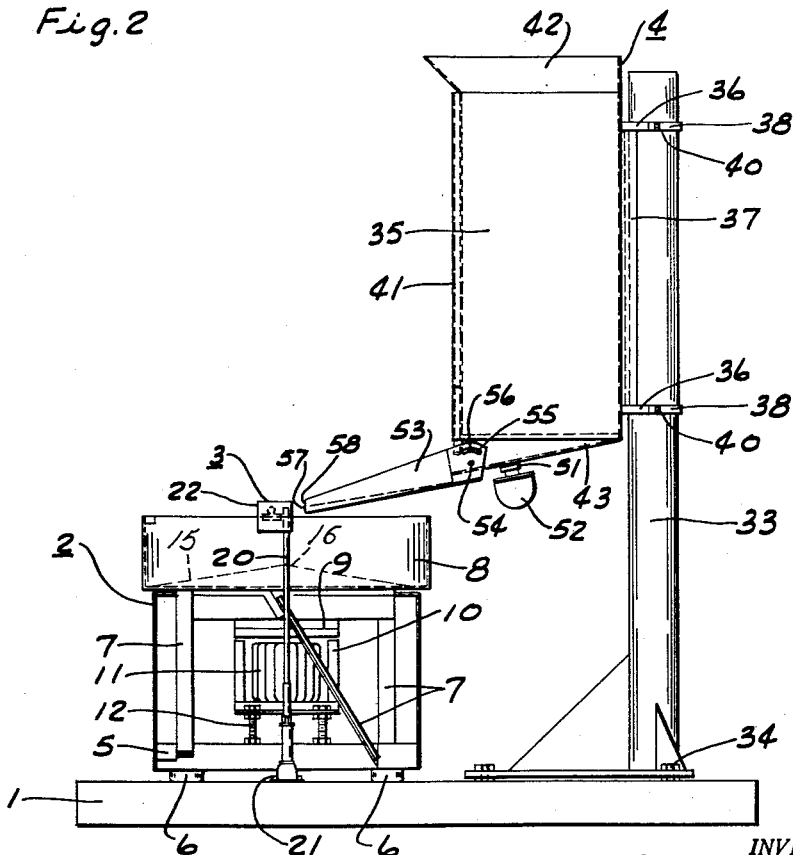
Fig. 1 is a view in side elevation, showing a feeder bowl and hopper with a control therefor.

Referring to Figs. 1 and 2 of the drawings, a device is mounted on the table 1 which comprises the bowl feeder as indicated at 2. The bowl level switch is indicated at 3 and the hopper supply is indicated at 4.

A feeder bowl comprises the base 5 supported on resilient feet 6 and provided with a plurality of upwardly sloping springs 7 which carry the bowl member 8 and the under side of the bowl member is provided with the armature 9 which is in operative relation to the core member 10 about which is wound the electromagnet field 11 and which is supported by means of the adjustable bracket 12 to the base 5. This electromagnetic coil is ordinarily supplied with alternating current connected through a rectifier to permit the coil to be energized only on every half cycle of the operating alternating current voltage, thereby driving the bowl at a frequency equal to the frequency of the alternating current supply. The resistor is ordinarily placed in series with the rectifier in order to control the magnitude and thereby control the feeding action. The springs 7 of which there are four indicated in the drawing support the bowl and the armature to vibrate at a natural period a few cycles other than the frequency of the supply of alternating current. This bowl motor is encased as indicated.

The bowl member 8 is provided with a spiral track as indicated at 13 which starts at 14 on the perimeter of the conical bowl bottom 15, the apex of which is indicated at 16. The helical track is inclined upwardly around the inside wall of the bowl to the top thereof where it is discharged at 17.

Ordinarily the pinnacle or apex 16 of the conical bottom 15 is alined with the vertical central axis around which the springs 7 are symmetrically mounted and causes the bowl to oscillate in an inclined arcuate path of movement when guided by the flexibility of the springs 7. It will be noticed that the springs are disposed to reciprocate the bowl in its inclined arcuate path of movement to feed the articles around the bowl and upwardly around the helical track to the point of discharge 17.

Figure 6:
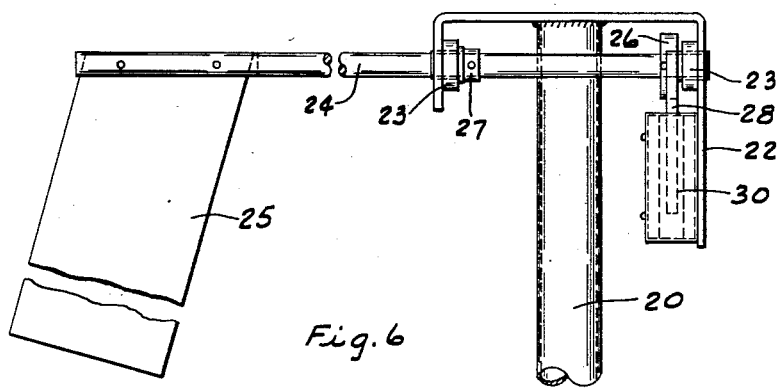
Fig. 6 is an enlarged view of the inside elevation of the hopper level switch.
Figure 7:
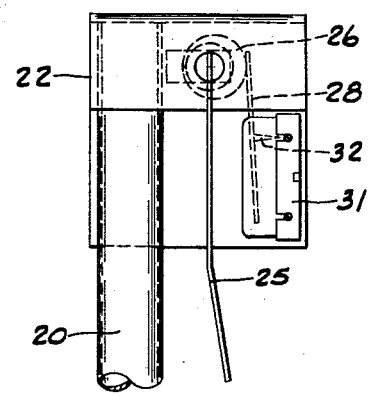
Fig. 7 is a view showing the cam of the hopper level switch.

The bowl level switch 3 is provided with the standard 20 which is secured as indicated at 21 to the table 1 and is adjustable in itself and the switch housing 22 is likewise adjustable along the upper section of the standard 20. As indicated in Figures 6 and 7 the support frame 22, as shown in Fig. 6, is in the form of a bracket having on opposite legs the bearings 23 which carry the shaft 24, the outer end of which is provided with a downwardly and outwardly sloping paddle 25. The opposite end of the shaft has attached thereto the cam member 26 which is adjacent one of the bearings 23. The other bearing has a stop member 27 thereby holding the shaft 24 from undue end play and holding the paddle 25 in the proper position in the feeder bowl. If it is desired to adjust the relative radial position of the paddle 25 in the feeder bowl all that is necessary to do is to release the cam 26 and the stop member 27 and reposition them on the shaft 24 so as to properly position the paddle 25 radially in the feeder bowl and again secure the cam and the stop to the shaft 24.

The cam 26 engages the lever 28 which extends into the switch member 30. The switch member 30 is provided with a micro switch as indicated at 31 and the lever member 28 engages the button 32 of the micro switch 31 when the cam 26 is at its greatest position as indicated in Fig. 7. This is when the shaft is rotated by the paddle 25 so as to shift the cam twenty or more degrees. The lever 28 permits the button 32 to be released and thereby opens this circuit of the micro switch 31.

Referring to Figs. 1 to 5 inclusive, the hopper structure 4 is mounted on the standard 33 secured to the table as indicated at 34 and having the hopper proper 35 supported thereon by the adjustable bracket members 36. A brace member 37 connects the brackets 36. Each bracket 36 is provided with a cap member 38 held by the screw members 40 as illustrated in Fig. 3. The hopper 35 has a substantially square cross section as illustrated in Fig. 2 and has a funnel top 42 and a sloping bottom 43 having upwardly extending sides attached to the sides of the hopper. The front of the hopper has a gate member 44 which is a pan shaped member with an outwardly projecting annular lip. The front 41 of the hopper has a nut 45 secured thereto which receives the bolt 46 that passes through the slot 47 in the gate 44. The sides of the hopper are turned inwardly to form the flanged enclosure 48 to retain the gate member 44 when it is slid up and down. This gate member may best be dropped until it substantially closes the normal opening of the hopper which is indicated by the line 50.

The sloping bottom 43 has a reinforcing member 51 secured on the under side thereof to form the base for mounting the vibrator 52 which parts constitute a vibrating hopper discharge means. The vibrator, when energized, vibrates the bottom 43 of the hopper and thus allows the parts thereon to slide downwardly across the sloping surface into the discharge spout 53. The discharge spout 53 has upwardly extending sides which are pivoted to the sides of the bottom 43 as indicated at 54. A slot 55 in the upper portion of the sides of chute permit the same to be clamped by the bolt 56 at different angles relative to the bottom 43. Thus, the chute or spout 53 may be adjusted to different angular positions to regulate the flow of the parts.

As shown in Fig. 4, the spout 53 has a trihedral abutment member 57 secured to the center thereof causing the parts to separate and come from the mouth 58 on either side of the abutment. As shown in Fig. 2 the center of the abutment and the spout 53, discharges the parts substantially in the center of the feeder bowl. The mouth 58 of the spout is actually slightly above the rim of the feeder bowl, and the paddle 25 of the hopper level switch sweeps downwardly and to the right as shown in Fig. 2 which is in the direction of the flow of the articles as they travel around the bowl. Thus, the articles immediately discharged are necessarily fed around the bowl before they come in contact with the paddle 25.

Figure 8:
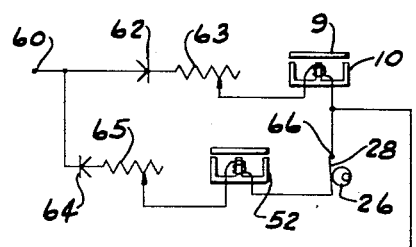
Fig. 8 is a diagrammatic circuit for the electro magnetic motors of the bowl feeder and hopper vibrator.

Referring to Fig. 8, the alternating current supply is indicated by the lines 60 and 61. Line 60 is connected through the rectifier 62 and the variable resistance 63 thence to the electromagnetic field member 11 in series, and to the other side of the alternating current 61. Line 60 is also connected in series through the rectifier 64 to the variable resistance 65 and the coil of the electro magnetic vibrator 52 and to the micro switch as indicated at 31, and is represented in this diagrammatic showing as the front contact member 66 which is engaged by the flexible arm member 30 when the cam member 26 is rotated so that the greatest portion of the cam depresses the arm 30 into engagement of the contact 66, thereby completing the circuit of the vibratory motor 52 to the other side of the alternating current line 61. Thus, when the blade member 25 is down, and is not pushed up by the parts, which indicates the condition that there are not too many parts in the feeder bowl, the vibrator circuit 52 is maintained closed by the cam 26, holding the arm 28 in circuit closing position with the contact 66 to maintain the vibrator member 52 energized for the purpose of constantly supplying parts from the sloping bottom 43 of the hopper out the chute 53 to the bowl. If the parts accumulate more than that desired, the paddle 25 is lifted, thereby rotating the shaft 24 and causing the cam member 26 to permit the arm member 18 to open its engagement with the contact 66, thereby de-energizing the vibratory motor 52 and thus stopping any feeding action from the bottom of the hopper to the feeder bowl.

We claim:

1. A dispenser comprising a control for dispensing materials to be fed, a vibrating bowl with an upwardly extending discharge track in which a mass of materials are circulated so that they may separate and be fed along the track, means for vibrating said bowl to feed the materials up said track, a hopper having associated therewith a vibrating hopper discharge means that feeds materials to said vibrating bowl, means to vibrate said hopper discharge means, said control comprising a paddle pivotally mounted independently of said vibrating bowl to be suspended therein and engage the circulating materials, and a switch actuated by said paddle to control the vibration of the hopper discharge means and maintain a proper quantity of materials in said vibrating bowl.

2. The dispenser control of claim 1 characterized by a shaft pivotally supporting said paddle in said bowl, and means to clamp said shaft to support said paddle at different radial positions in said bowl between the center of the bowl and said track.

3. The dispenser control of claim 1 characterized by a shaft pivotally supporting said paddle in said bowl, and means to clamp said shaft to support said paddle at different elevated positions above the bottom of said bowl.

4. The dispenser control of claim 1 characterized by means to support said hopper for movement to different elevations relative to said feeder bowl, said hopper discharge means having a chute pivotally mounted thereon to be set at different angular positions and to slope downwardly to deliver materials to said bowl regardless of the vertical position of said hopper, the inclination of said chute changing the effect of the exodus of the materials from said hopper.

5. The dispenser control of claim 1 characterized in that said vibrating hopper discharge means slopes downwardly to a mouth at the front of said hopper, and an upstanding gate supported from the front of said hopper and extending down over said mouth to restrict the same.

6. The structure of claim 1 characterized in that said downwardly and forwardly sloping hopper discharge means has sides attached to said hopper and terminates in a mouth, a chute supported on said sides and extending from under said mouth to receive the materials therefrom, said chute narrowing from said mouth and having upwardly extending sides.

7. The structure of claim 6 which also includes a trihedron on the floor of said chute intermediate the upwardly extending sides.

References Cited in the file of this patent

UNITED STATES PATENTS

| | | |
|---|---|---|
| 2,014,617 | Fischer | Sept. 17, 1935 |
| 2,408,221 | Michel | Sept. 24, 1946 |
| 2,568,332 | Genovese | Sept. 18, 1951 |
| 2,638,248 | Alvord | May 12, 1953 |
| 2,763,400 | Francis | Sept. 18, 1956 |